Jan. 17, 1950  B. J. PILLINER  2,495,130
CRIMPING OR PLEATING APPARATUS AND METHOD
Filed April 5, 1944   6 Sheets-Sheet 2
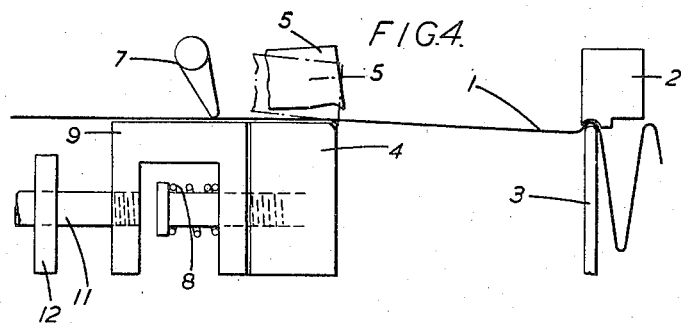
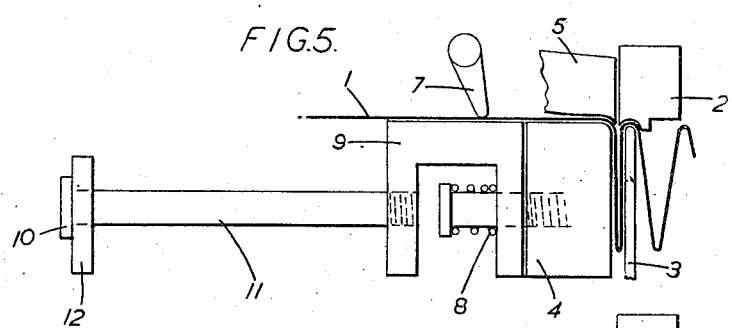
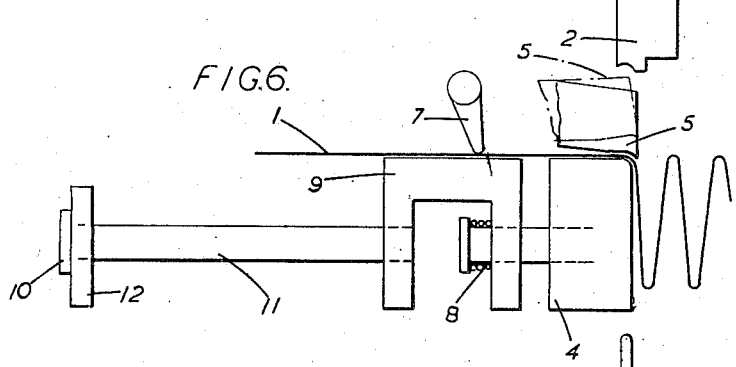
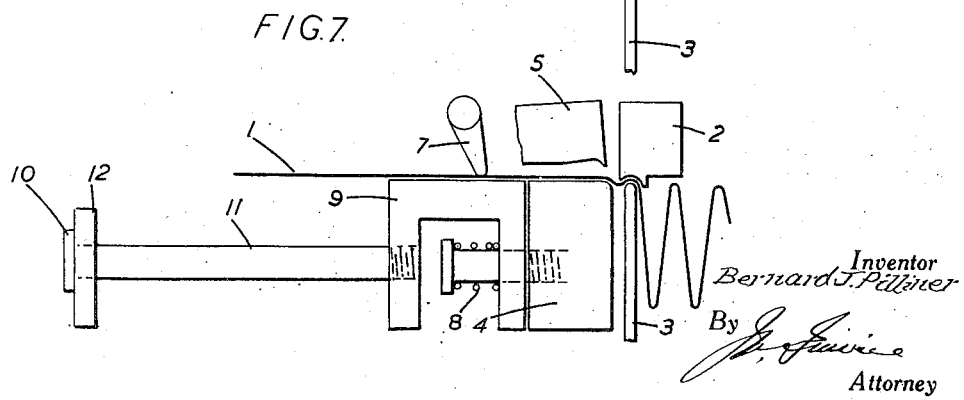
Inventor
Bernard J. Pilliner
By
Attorney

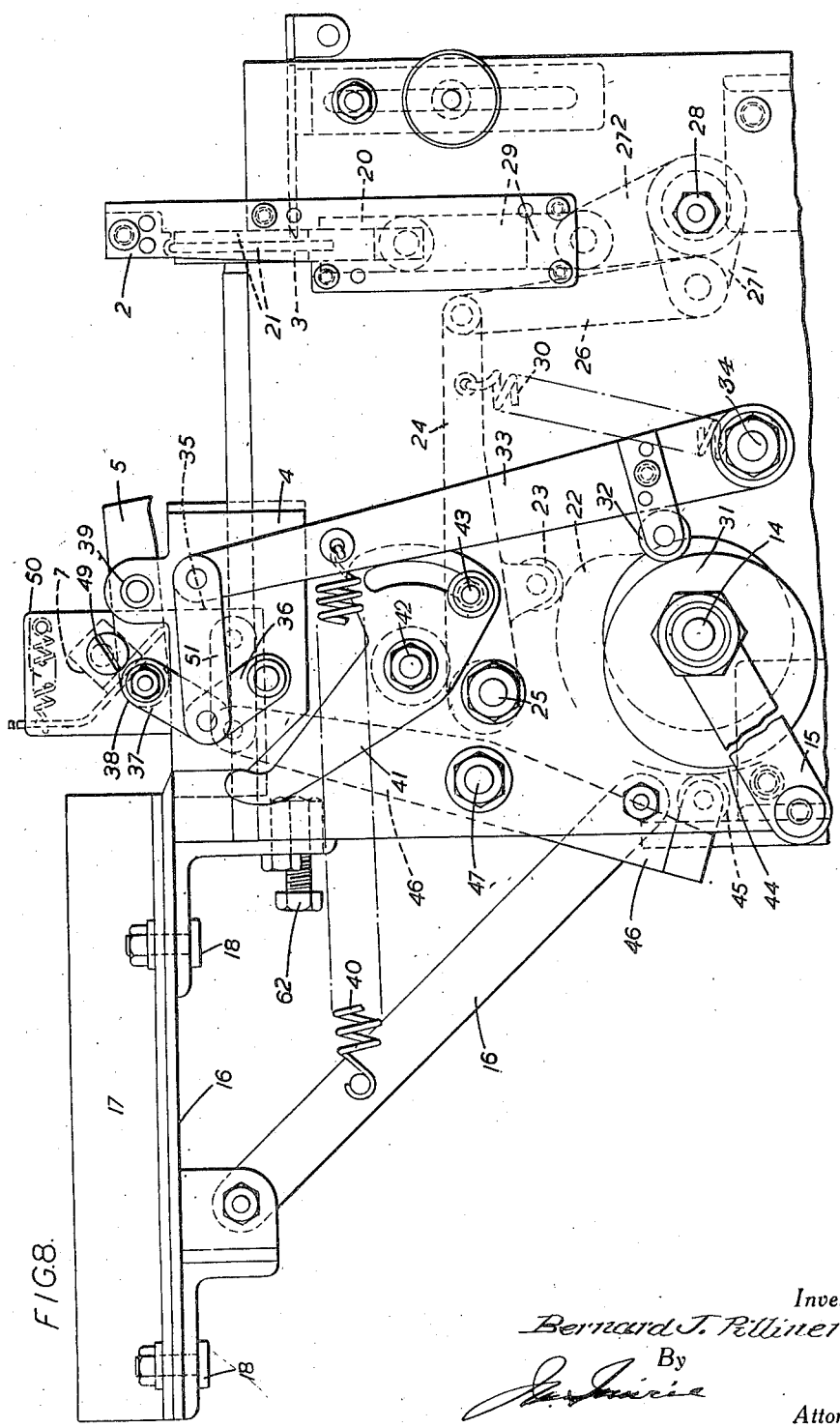

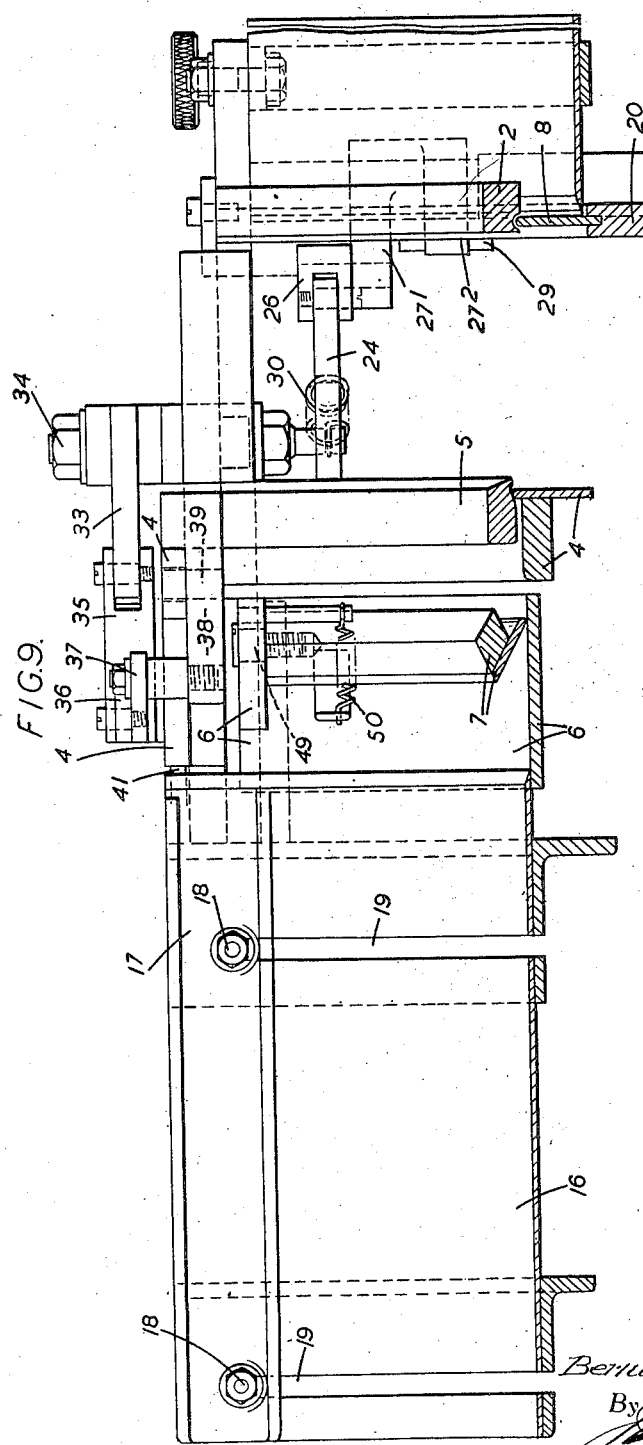

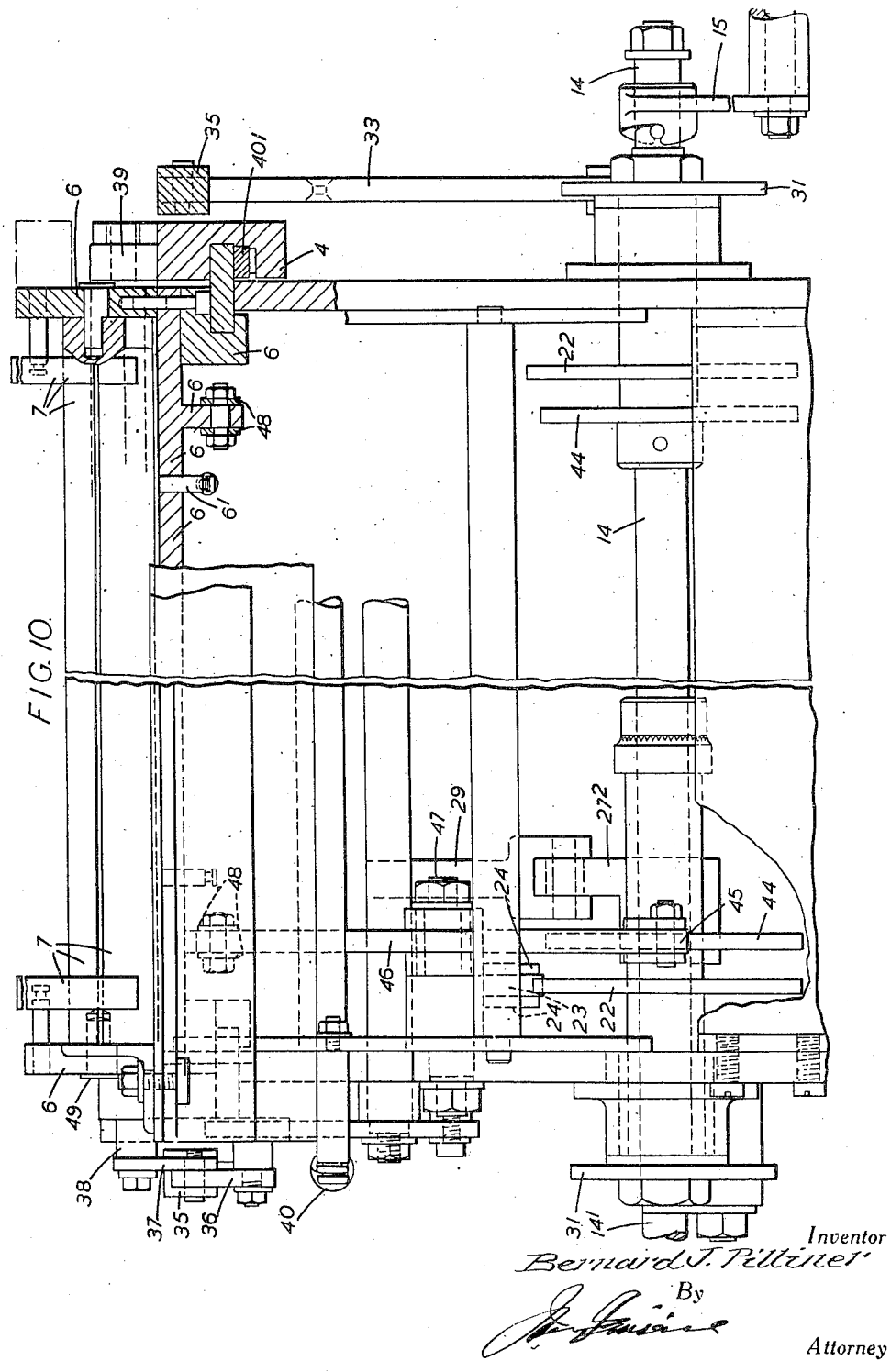

Jan. 17, 1950   B. J. PILLINER   2,495,130
CRIMPING OR PLEATING APPARATUS AND METHOD
Filed April 5, 1944   6 Sheets-Sheet 6
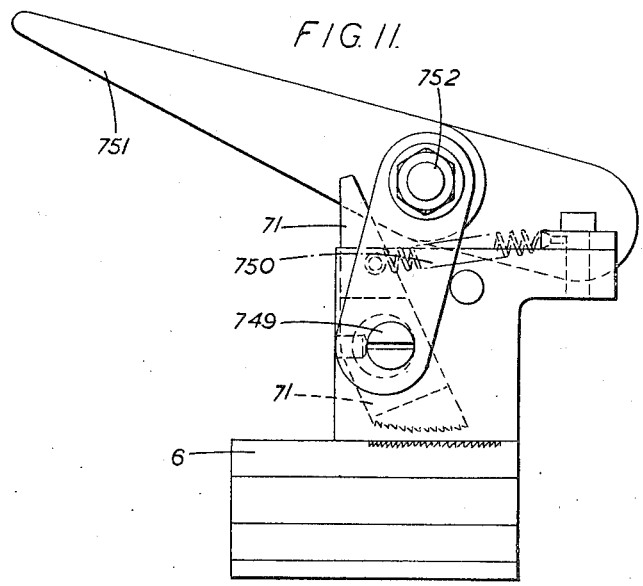
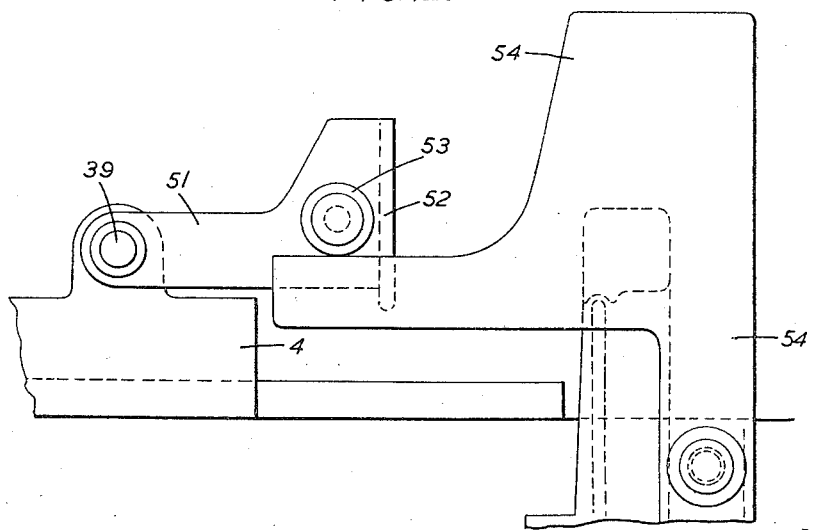
Inventor
Bernard J. Pilliner
By
Attorney Patented Jan. 17, 1950

2,495,130

UNITED STATES PATENT OFFICE 2,495,130

CRIMPING OR PLEATING APPARATUS AND METHOD

Bernard Joseph Pilliner, Guildford, England, assignor to Vokes Limited, London, England Application April 5, 1944, Serial No. 529,697
In Great Britain April 15, 1943

13 Claims. (Cl. 223—30)

This invention was more especially designed for forming deeply crimped or pleated filter screens, though it is applicable to analogous operations. Such screens commonly include metal gauze or a stiff textile gauze, such as buckram, for stiffening; they may for example consist of a layer of gauze with felt or fabric attached or of two layers of gauze with a layer of felt or fabric or other filtering medium between them or of layers of gauze without fabric. A strip of the material, usually with its edges finished in the desired manner, is first prepared and then deeply pleated: the pleating is normally a somewhat difficult operation to perform accurately and quickly with the desired small uniform bend at one end of each pleat and possibly a sharper bend at the other.

The method of the present invention is to grip the front and back ends of the length of the material necessary to form a pleat of the required depth and then to cause the gripping devices to come together to a predetermined distance to make the desired fold, the gripping means being formed to complete a bend at the front end and to initiate the formation of the next bend (at the back end): as the back clamp is withdrawn to take a new grip, the front gripping device is opened and the material fed forward by a one-way clamp until the next (partly formed) radius comes into front gripping position, when the front gripping device closes, preferably just before the back gripping device, and the operations are repeated. The nature of the bottom fold may be varied by adjusting the forward limit of the folding stroke. In the preferred form the upper jaw of the front gripping device is concave of the desired external bend of the fold; in front it may be substantially a quadrant, with a backwardly facing lip representing perhaps an additional 45° of the eventual approximate semi-circle. The lower jaw is in the form of a plate with its upper end rounded to the desired internal bend. The back gripping device is largely flat, the lower jaw having its front corner, formed to the required bend to make an internal quadrant, merging into a flat front surface parallel to the plate jaw of the front gripper and the upper jaw having a forwardly facing lip, corresponding to the backwardly facing lip of the front upper jaw. A pivoted spring clamping plate, forming a forwardly inclined holding dog and co-operating with an anvil with forwardly inclined serrations, will serve to feed forward the material supported on a flat surface. A push feed can be used, separately operated at the proper stage in the cycle, or a draw feed operated by the back gripping device when the front jaws open.

The invention will be better understood by reference to the accompanying drawings which illustrate the method and a typical machine in accordance with the invention. The parts of the invention for which a monopoly is desired are those delimited by the claims.

In the drawings:

Figs. 4, 5, 6 and 7 are diagrams illustrating an alternative form with a draw feed.

Figs. 8, 9 and 10 are respectively a side elevation, part plan and partly sectioned front elevation showing in some detail a machine embodying the mechanism of Figs. 1, 2 and 3.

Fig. 11 is a detail showing a preferred form of the feed clamp shown for the sake of clearness in simplified form in Figs. 8, 9 and 10.

Fig. 12 is an attachment which may be added to the showing of Fig. 1; but it is shown separately to avoid confusion.

Figure 1:
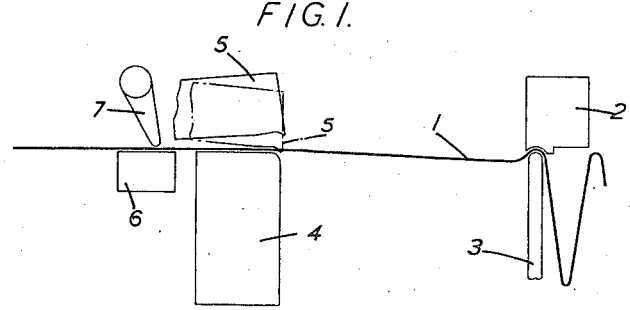
Figs. 1, 2 and 3 are diagrams illustrating the essential elements of a typical form of mechanism according to the invention and the successive steps of the process.
Figure 2:
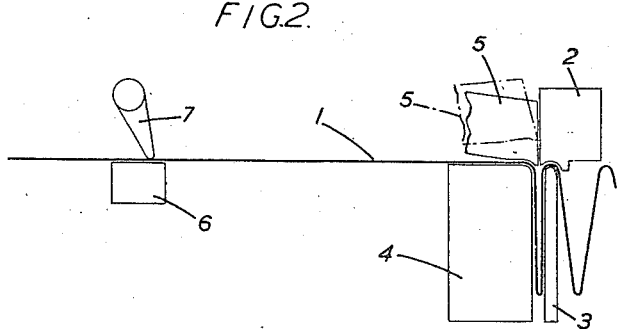
Figure 3:
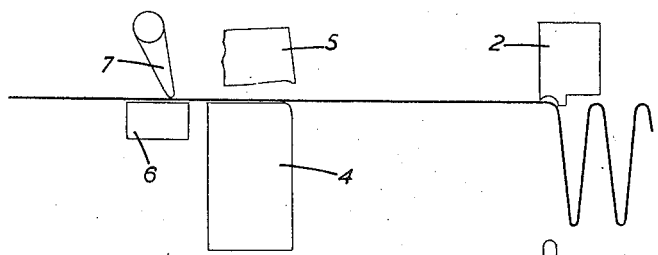

Referring first to Figs. 1, 2 and 3, Fig. 1 shows the material 1 held in the front gripping device between the suitably rounded recess of the fixed member 2 and the correspondingly rounded upper edge of the clamping bar 3. The back gripping device is slidable as a whole and is at the back of its stroke: the material is about to be gripped between the rounded edge of the sliding anvil 4 and the correspondingly rounded front end of the clamping dog 5 pivoted to the anvil 4. The clamping dog 5 next moves into the dotted line position, gripping the material and initiating the formation of the required bend at that point. The anvil 4 is now ready to start its folding stroke, the completion of which is shown by Fig. 2. At the same time the feed slide 6, with the one-way gravity or spring-held holding dog 7, is withdrawn to the back of its stroke, representing the distance between the centres of the bend just completed between members 2 and 3 and that initiated between members 4 and 5. The clamping dog 5 then returns to its open position, shown dotted. As the sliding anvil 4 is withdrawn to the back of its stroke the clamping bar 3 is withdrawn and the feed slide 6 sequentially moved forward, bringing the parts to the positions shown in Fig. 3. As soon as the feeding stroke has finished, the clamping bar 3 rises, completing the cycle of operations by bringing the parts again to the position of Fig. 1.

Figs. 4 to 7 show the use of a draw feed. In this case a spring 8 can withdraw the back gripping device, 4, 5 towards the holding dog 7 when its upper jaw 5 opens at the end of the feed stroke (Figs. 6 and 7), enabling the front gripping device 2, 3 to close before the general withdrawal takes place preliminary to the next folding stroke. In this case the folding slide 4 forming the anvil of the back gripping device can be slidable relatively to a control slide 9, the two slides being spring urged together by the compression spring 8. When the folding stroke is about to complete the control slide 9 is checked (Fig. 5), for example by the head 10 of rod 11 coming up against a fixed bar 12. But both top and bottom jaws 2, 3 of the front gripping device open (Fig. 6) to allow of forward feed of the crimped material by the back gripping device 4, 5 as it draws away from the control slide 9. As soon as the back gripping device 4 and 5 opens the folding slide 4 is drawn back by the spring 8 on the control slide 9 (Fig. 7), which latter with the dog 7 holds the material until the front gripping device 2, 3 closes. It will be remembered that with the push feed only the lower or plate jaw 3 of the front gripping device need open (Fig. 3) and in both cases it does so sufficiently to allow the formed crimp to pass as the material is fed forward.

It will be apparent that the whole of the operations can be readily carried out by cam operation. Thus in a preferred form of machine shown by Figures 8 to 11 a main cam shaft 14 is driven in any convenient manner, as by crank-handle 15 or from a power-driven end 14'. The work to be crimped or pleated is placed on a table 16 provided with guiding angles 17 adjustable to suit the width of the work by bolts 18 engaging slots 19 in the table. The fixed member 2 of the front gripping means is shown near the right of Figures 4 and 5 and the work, after being passed under the holding dog 7 of the feed clamp and the clamping dog 5 of the back gripping means is gripped between the fixed member 2 and the clamping bar 3. The bar 3 is carried on a mounting 20 and is slidable between vertical guides 21. It is operated by cam 22 mounted on camshaft 14. The cam 22 engages a roller 23 carried by a lever 24 pivoted on a conventional eccentric type pivot pin 25 whereby its pivotal axis can be adjusted. A link 26 connects lever 24 to one arm 27' of a bell crank pivoted on an eccentric type pivot pin 28, the second arm 27² of the bell crank being coupled by a link 29 to the slidable mounting 20 of the clamping bar 3. A tension spring 30 holds the roller 23 to the cam 22, so that the cam action raises the bar 3 against the spring action.

The folding slide 4 and its clamping dog 5 are operated from cam 31 through a roller 32 carried by a lever 33 swinging on an eccentric type adjustable pivot 34. A link 35 connects the lever 33 to a pair of toggle links of which one 36 is directly pivoted to the slide 4 and the other 37 is connected to an arm 38 of the clamping dog 5 which is itself pivoted at 39 to the slide 4. The roller 32 is held to the cam 31 and the slide held resiliently back against the cam action by tension spring 40. It will be apparent that as the slide begins to be moved forward the toggles cause the clamping dog to close on the material and that at the beginning of the return movement the toggles first release the clamping dog. A friction pad 40¹ attached to the slide 4 increases its frictional resistance and ensures that the toggle mechanism operates effectively before the slide 4 moves. An adjustable stop 41 pivoted at 42 and held in adjusted position by a bolt at 43 will limit the movement of the slide 4 to the left (Fig. 8) and thus adjust the length of material to be folded by limiting the backward movement of the feed slide 6, and so the depth of the crimp or pleat.

The feed slide 6 is operated from cam 44 through a roller 45 carried by a lever 46 swinging on an eccentric type adjustable pivot 47. The feed slide is urged backward by conventional tension springs engaging the necks or grooves of pins 6' (Fig. 10). A link 48 connects the upper end of the lever 46 to the slide 6, end brackets of which carry the feed holding dog 7 by adjustable eccentric type pivots 49. The holding dog 7 is urged towards its closed position by tension springs 50. Adjustment of the feed stroke can be made by screw 62 which serves as a stop behind the upper arm of the lever 46 and limits the backward movement of the feed slide 6.

The operation and timing is in accordance with Figs. 1 to 3 and need not be described again.

To avoid complication the holding dog 7 of the feed is shown in its simplest form, but a better grip is obtainable by the form of Fig. 11 in which any desired number of dogs 71 are independently mounted on an adjustable pivot rod 749 and urged towards clamping position by springs 750. A lever 751 pinned on a cross-rod 752 enables all the dogs 71 to be eased up simultaneously by an operator when material is being inserted.

Fig. 12 shows an attachment to ensure the downward folding of the material between the front gripping device and the folding slide in cases where the initial tendency given by the gripping devices does not do so. It comprises side brackets 51, pivotally mounted on extensions of the pivot pins 39 for the dog 5 which are carried by brackets formed on the slide 4 and carrying a blade 52 which will rest on the upper surface of the material. Rollers 53 carried by the brackets run on the curved track afforded by fixtures 54, so that the blade rises clear after the folding action has started.

I claim:

1. Apparatus for forming folds or pleats in lengths of material, including front gripping means, back gripping means, material feeding means, means for closing the front gripping means and thereby initiate a bend, means for closing and opening the back gripping means, means supporting the respective gripping means for relative reciprocating movement, means for moving said respective gripping means together to form a fold and then from each other preparatory to forming another fold, means for opening the front gripping means for passage of the formed fold, and means for operating the material feeding means to bring the part last gripped by the back gripping means into position for gripping by the front gripping means.

2. Apparatus according to claim 1 in which the front gripping means includes a movable member having a surface capable of holding the front of a material bend during its formation.

3. Apparatus according to claim 1 wherein the parts forming the front gripping means include a surface capable of holding the back of a material bend during its formation and a movable member of plate-like form to cooperate with said surface to complete the front gripping means to determine the form of the bend.

4. Apparatus according to claim 1 in which the means for closing and opening the back gripping means include means for closing and opening said gripping means when the front and back gripping means respectively draw together and apart.

5. Apparatus according to claim 1 in which the front gripping means are in a fixed location and the back gripping means and material feeding means are movable.

6. Apparatus according to claim 1 wherein the operating means are provided with adjusting devices controlling the extent of movement of operated parts.

7. Apparatus according to claim 1 wherein additional means are provided to ensure that the predetermined fold is formed in the material between the front and back gripping means.

8. Apparatus for forming pleats in material comprising front and back gripping means supported for movement relative to each other, said gripping means each including a pair of members for gripping the material at predetermined spaced apart positions, said pairs of members having complementary curved gripping surfaces for bending the gripped material to initiate a pleat formation, means for closing said gripping members upon the material during the pleat forming operation and opening the members to release the material during separating movement of the respective gripping means, and mechanism operative to permit forward movement of the material as the gripping means are moved together but to hold the material against backward movement when said members are released and said gripping means separated.

9. A folding or pleating apparatus comprising a pair of gripping devices for gripping a sheet of material at spaced points, means supporting said devices for movement relative to each other, means for moving said devices toward each other to form a fold in the material, a fold initiating blade normally positioned between said devices for contacting the material substantially on the line of a fold to be made to initiate the folding of the material along such line, means for movably supporting said blade on one of said gripping devices, and means for moving said blade out of the path of said devices as they are moved together.

10. An apparatus as defined in claim 9 wherein said blade supporting means is pivotally mounted on said gripping device, and said blade moving means comprises a stationary cam for biasing said blade out of the path of said devices.

11. An apparatus as defined in claim 9 wherein said blade supporting means is mounted on one gripping device and carries cam following means, and said blade moving means comprises a cam fixed in stationary relationship relative to the other gripping device.

12. A method of forming a succession of pleats of predetermined shape and size, consisting in gripping the opposite sides of a material at one end of a predetermined length of the material and simultaneously forming the gripped material into a complete bend, gripping the opposite sides of the material at the opposite end of such predetermined length and simultaneously forming the gripped material into a partial bend, moving said gripped ends toward each other through a predetermined distance to cause the intermediate portion of the predetermined length of the material to fold together to form a pleat, releasing the bent ends of the length of material, and positioning the partial bend of the material for gripping and forming a complete bend therein as the first mentioned end of a succeeding length of material.

13. The method of forming a pleat in sheet material which comprises positioning the sheet substantially in a plane, gripping both sides of the positioned sheet at two selectively spaced positions on a straight length of the sheet, moving the two gripped portions of the sheet toward each other to fold the length of the sheet therebetween, and forming the gripped portions of the sheet simultaneously with the gripping thereof into bends from the plane of the sheet to direct the sheet during the folding thereof into a pleat forming fold.

BERNARD JOSEPH PILLINER.

REFERENCES CITED

The following references are of record in the file of this patent:

UNITED STATES PATENTS

| Number | Name | Date |
| --- | --- | --- |
| 671,791 | Chandler | Apr. 9, 1901 |